United States Patent [19]
Bartlett et al.

[11] Patent Number: 5,182,040
[45] Date of Patent: Jan. 26, 1993

[54] AZEOTROPIC AND AZEOTROPE-LIKE COMPOSITIONS OF 1,1,2,2-TETRAFLUOROETHANE

[75] Inventors: Philip L. Bartlett, Wilmington, Del.; Donald B. Bivens, Kennett Square; Brooks S. Lunger, Coatesville, both of Pa.; Akimichi Yokozeki, Greenville, Del.

[73] Assignee: E. I. Du Pont de Nemours and Company, Wilmington, Del.

[21] Appl. No.: 676,637

[22] Filed: Mar. 28, 1991

[51] Int. Cl.$^5$ .......................... C08J 9/06; C09K 3/30; C09K 5/04; C11D 7/30
[52] U.S. Cl. .......................... 252/67; 62/114; 203/67; 252/162; 252/170; 252/171; 252/305; 252/364; 252/DIG. 9; 264/53; 264/DIG. 5; 521/98; 521/131; 521/910
[58] Field of Search ............... 252/162, 170, 171, 172, 252/DIG. 9, 67, 305, 364; 134/40; 62/114; 264/53, DIG. 5; 203/67; 521/98, 131, 910

[56] References Cited

U.S. PATENT DOCUMENTS

| | | | |
|---|---|---|---|
| 3,732,150 | 5/1973 | Bailey | 203/44 |
| 4,226,976 | 10/1980 | Goodman et al. | 528/498 |
| 4,771,080 | 9/1988 | Ibuki et al. | 521/56 |
| 4,810,316 | 3/1989 | Wakabayashi et al. | 156/78 |
| 4,983,312 | 1/1991 | Tamura et al. | 252/67 |
| 5,061,394 | 10/1991 | Bivens et al. | 252/171 |

FOREIGN PATENT DOCUMENTS

| | | |
|---|---|---|
| 2658508 | 8/1991 | France . |
| 63-308084 | 12/1988 | Japan . |
| 63-308085 | 12/1988 | Japan . |
| 3-077821 | 4/1991 | Japan . |
| 9100576 | 2/1991 | Norway . |
| 91/13968 | 9/1991 | World Int. Prop. O. . |

*Primary Examiner*—Linda Skaling
*Attorney, Agent, or Firm*—James E. Shipley

[57] ABSTRACT

The azeotropic and azeotrope-like compositions of 1,1,1,2-tetrafluoroethane and one of 1,1-difluoroethane, 1-chloro-1,1,-difluoroethane, dimethyl ether, perfluorocyclobutane, n-butane, isobutane and 1,1,1,2,3,3,3-heptafluoropropane, and their use as refrigerants, aerosol propellants and blowing agents for polymer foams are disclosed. The azeotropic and azeotrope-like compositions of 1,1,1,2-tetrafluoroethane and one of perfluorocyclobutane and 1,1,1,2,3,3,3-heptafluoropropane are also useful as fire extinguishants.

9 Claims, No Drawings

AZEOTROPIC AND AZEOTROPE-LIKE COMPOSITIONS OF 1,1,2,2-TETRAFLUOROETHANE

FIELD OF THE INVENTION

This invention relates to azeotropic and azeotrope-like mixtures of 1,1,2,2-tetrafluoroethane (HFC-134) and one of 1,1-difluoroethane (HFC-152a), 1-chloro-1,1-difluoroethane (HCFC-142b), dimethyl ether (DME), 1,1,1,2,3,3,3,-heptafluoropropane (HFC-227ea), perfluorocyclobutane (FC-C318), n-butane or isobutane and their use as refrigerants, aerosol propellants and blowing agents for polymer foams. The azeotropic and azeotrope-like compositions of 1,1,1,2-tetrafluoroethane and one of perfluorocyclobutane and 1,1,1,2,3,3,3-heptafluoropropane are also useful as fire extinguishants. As used herein, extinguishant means the active ingredient used to extinguish fires.

BACKGROUND OF THE INVENTION

The mixtures of the present invention are useful as refrigerants, heat transfer media, gaseous dielectrics, foam expansion agents, aerosol propellants and power cycle working fluids. These mixtures are potentially environmentally safe substitutes for commercial refrigerants such as dichlorodifluoromethane (CFC-12).

Closed-cell polyurethane foams are widely used for insulation purposes in building construction and in the manufacture of energy efficient electrical appliances. In the construction industry, polyurethane (polyisocyanurate) board stock is used in roofing and siding for its insulation and load-carrying capabilities. Poured and sprayed polyurethane foams are also used in construction. Sprayed polyurethane foams are widely used for insulating large structures such as storage tanks, etc. Pour-in-place polyurethane foams are used, for example, in appliances such as refrigerators and freezers, plus they are used in making refrigerated trucks and railcars.

All of these various types of polyurethane foams require expansion agents (blowing agents) for their manufacture. Insulating foams depend on the use of halocarbon blowing agents, not only to foam the polymer, but primarily for their low vapor thermal conductivity, a very important characteristic for insulation value. Historically, polyurethane foams are made with trichlorofluoromethane (CFC-11) as the primary blowing agent.

A second important type of insulating foam is phenolic foam. These foams, which have very attractive flammability characteristics, are generally made with CFC-11 and CFC-113 blowing agents.

A third type of insulating foam is thermoplastic foam, primarily polystyrene foam. Polyolefin foams (polyethylene and polypropylene) are widely used in packaging. These thermoplastic foams are generally made with CFC-12.

Many refrigeration applications, e.g. refrigerators, auto and window air conditioners, etc., presently use CFC-12 as the refrigerant. HFC-134 is a fluorocarbon compound identified as a potential replacement for CFC-12, having properties near those of CFC-12, and being nonflammable with a zero ozone depletion potential. HFC-134 has a thermodynamic refrigeration coefficient of performance somewhat better than that of CFC-12, which may result in energy saving refrigeration applications when HFC-134 is substituted for CFC-12.

Many products designed for household, personal or industrial use are available as aerosol products. Typical examples of such products and ones in which the propellant system of the present invention can be used include personal products such as hair sprays, deodorants and colognes; household products such as waxes, polishes, pan sprays, room fresheners and household insecticides; industrial products such as cleaners, lubricants, and mold release agents; and automotive products such as cleaners and polishes. All such products utilize the pressure of a propellant gas or a mixture of propellant gases (i.e., a propellant gas system) to expel the active ingredients from the container. For this purpose, most aerosols employ liquified gases which vaporize and provide the pressure to propel the active ingredients when the valve on the aerosol container is pressed open.

An important physical property associated with the dispensing of aerosol products is the vapor pressure of the propellant. Vapor pressure from the viewpoint of this invention is the pressure exerted when a liquified propellant gas is in equilibrium with its vapor in a closed container, such as an aerosol can. Vapor pressure can be measured by connecting a pressure gauge to the valve on an aerosol can or gas cylinder containing the vapor/liquid mixture. A standard of measurement of vapor pressure in the U.S. aerosol industry is pounds per square inch gauge (psig) with the gas/liquid mixture at constant temperature, most commonly at 70° F. (21° C.). The vapor pressures of liquified gases most widely employed as aerosol propellants will vary over the range of about 20 to 90 psig (239 to 722 kPa) at 70° F. (21° C.). The propellant systems of the present invention have vapor pressures in this latter range.

In the early 1970s, concern began to be expressed that the stratospheric ozone layer (which provides protection against penetration of the earth's atmosphere by ultraviolet radiation) was being depleted by chlorine atoms introduced to the atmosphere from the release of fully halogenated chlorofluorocarbons. These chlorofluorocarbons are used as propellants in aerosols, as blowing agents for foams, as refrigerants and as cleaning/drying solvent systems. Because of the great chemical stability of fully halogenated chlorofluorocarbons, according to the ozone depletion theory, these compounds do not decompose in the earth's atmosphere but reach the stratosphere where they slowly degrade, liberating chlorine atoms which in turn react with the ozone.

Concern reached such a level that in 1978 the U.S. Environmental Protection Agency (EPA) placed a ban on nonessential uses of fully halogenated chlorofluorocarbons as aerosol propellants. This ban resulted in a dramatic shift in the U.S. away from chlorofluorocarbon propellants (except for exempted uses) to primarily hydrocarbon propellants. However, since the rest of the world did not join the U.S. in this aerosol ban, the net result has been to shift the uses of chlorofluorocarbons in aerosols out of the U.S., but not to permanently reduce the world-wide total chlorofluorocarbon production, as sought. In fact, in the last few years the total amount of chlorofluorocarbons manufactured worldwide has exceeded the level produced in 1978 (before the U.S. ban).

During the period of 1978-1987, much research was conducted to study the ozone depletion theory. Because of the complexity of atmospheric chemistry, many questions relating to this theory remained unanswered. However, assuming the theory to be valid, the health risks which would result from depletion of the ozone layer are significant. This, coupled with the fact that worldwide production of chlorofluorocarbons has increased, has resulted in international efforts to reduce chlorofluorocarbon use. Particularly, in September, 1987, the United Nations through its Environment Programme (UNEP) issued a tentative proposal calling for a 50 percent reduction in worldwide production of fully halogenated chlorofluorocarbons by the year 1998. This proposal was ratified Jan. 1, 1989 and became effective on Jul. 1, 1989.

Because of this proposed reduction in availability of fully halogenated chlorofluorocarbons such as CFC-11, CFC-12 and CFC-113, alternative, more environmentally acceptable, products are urgently needed.

As early as the 1970s with the initial emergence of the ozone depletion theory, it was known that the introduction of hydrogen into previously fully halogenated chlorofluorocarbons markedly reduced the chemical stability of these compounds. Hence, these now destabilized compounds would be expected to degrade in the atmosphere and not reach the stratosphere and the ozone layer. The accompanying Table I lists the ozone depletion potential for a variety of fully and partially halogenated halocarbons. Halocarbon Global Warming Potential data (potential for reflecting infrared radiation (heat) back to earth and thereby raising the earth's surface temperature) are also shown.

TABLE I

| OZONE DEPLETION AND GREENHOUSE POTENTIALS | | |
|---|---|---|
| Blowing Agent | Ozone Depletion Potential | Halocarbon Global Warming Potential |
| CFC-11 (CFCl$_3$) | 1.0 | 1.0 |
| CFC-12 (CF$_2$Cl$_2$) | 1.0 | 3.1 |
| HCFC-22 (CHF$_2$Cl) | 0.05 | 0.34 |
| HCFC-123 (CF$_3$CHCl$_2$) | 0.02 | 0.02 |
| HCFC-124 (CF$_3$CHFCl) | 0.02 | 0.1 |
| HFC-134a (CF$_3$CH$_2$F) | 0. | 0.28 |
| HFC-134 (CHF$_2$CHF$_2$) | 0. | 0.3 (est. |
| HCFC-141b (CFCl$_2$CH$_3$) | 0.15 | 0.15 |
| HCFC-142b (CF$_2$ClCH$_3$) | 0.06 | 0.36 |
| HFC-152a (CHF$_2$CH$_3$) | 0. | 0.03 |
| CFC-113 (CF$_2$Cl—CFCl$_2$) | 0.8 | 1.4 |
| FC-C318 (CF$_2$—CF$_2$) (CF$_2$—CF$_2$) | 0. | Not available |
| HFC-227ea (CF3CHFCF3) | 0 | Not available |

Halocarbons such as HFC-134, HFC-152a, HFC-227ea and FC-C318 have zero ozone depletion potential. Dimethyl ether, n-butane and isobutane, having no halogen content, are also zero ozone depleters. HCFC-142b has an ozone depletion potential of 0.06.

Although 1,1,2,2-tetrafluoroethane has utility as a refrigerant, aerosol propellant or foam blowing agent, azeotropes offer the possibility of producing more economical nonfractionating systems with improved properties such as refrigeration performance, polymer and refrigerant oil solubility.

Unfortunately, as recognized in the art, it is not possible to predict the formation of azeotropes.

This fact obviously complicates the search for new azeotropes which have application in the field. Nevertheless, there is a constant effort in the art to discover new azeotropic compositions, which have desirable characteristics.

SUMMARY OF THE INVENTION

In accordance with the present invention, azeotropic or azeotrope-like mixtures have been discovered, which comprise effective amounts of 1,1,2,2-tetrafluoroethane (HFC-134) and one of 1,1-difluoroethane (HFC-152a), 1-chloro-1,1-difluoroethane (HCFC-142b), dimethyl ether (DME), 1,1,1,2,3,3,3-heptafluoropropane (HFC-227ea), perfluorocyclobutane (FC-C318), n-butane or isobutane.

In accordance with the present invention, azeotropic or azeotrope-like mixtures have been discovered, which consist essentially of effective amounts of 1,1,2,2-tetrafluoroethane (HFC-134) and one of 1,1-difluoroethane (HFC-152a), 1-chloro-1,1-difluoroethane (HCFC-142b), dimethyl ether (DME), 1,1,1,2,3,3,3-heptafluoropropane HFC-227ea, perfluorocyclobutane (FC-C318), n-butane or isobutane.

The azeotropes of HFC-134 and one of HCFC-142b, n-butane, HFC-227ea, isobutane and FC-C318 are minimum boiling azeotropes; thus, the vapor pressure is higher and the boiling point lower for the azeotropes than for the components. The azeotropes of HFC-134 and one of DME and HFC-152a are maximum boiling azeotropes; thus, the vapor pressure is lower and the boiling point higher for the azeotrope than for the components.

DETAILED DESCRIPTION OF THE INVENTION

The novel azetropic or azetrope-like compositions of the invention were discovered during a phase study wherein the compositions were varied and vapor pressures measured. By this procedure the following azeotropic compositions reported in Table II were discovered:

TABLE II

| Components | Composition* | Temp. °C. | Vapor Pressure, psia (kPa) |
|---|---|---|---|
| HFC-134/HFC-152a | 92.0/8.0 | 10 | 46.5 (321) |
| HFC-134/HCFC-142b | 95.9/4.1 | −17 | 16.6 (114) |
| HFC-134/DME | 73.5/26.5 | 0 | 28.1 (194) |
| HFC-134/FC-C318 | 62.3/37.7 | 0 | 36.9 (254) |
| HFC-134/n-butane | 83.1/16.9 | 10 | 56.9 (392) |
| HFC-134/isobutane | 76.7/23.3 | 10 | 63.5 (438) |
| HFC-134/HFC-227ea | 52.0/48.0 | −10 | 23.5 (162) |
| Atmospheric Boiling Points of Components, °C. | | | |
| HFC-134 | −19.5 | n-butane | −0.5 |
| HFC-152a | −25.0 | Isobutane | −11.7 |
| HCFC-142b | −9.8 | HFC-227ea | −18.0 |
| DME | −24.6 | | |
| FC-C318 | −6.1 | | |

*All compositions are ± 2 wt. percent.

For the purpose of this discussion, azeotropic, azeotropic-like or constant boiling is intended to mean also essentially azeotropic or essentially constant boiling. In other words, included within the meaning of these terms are not only the true azeotrope described above, but also other compositions containing effective amount of the same components in somewhat different proportions, which are true azeotropes at other temperatures and pressures, as well as those equivalent compositions which are part of the same azeotropic system and are azeotropic in their properties. As is well recognized in this art, there is a range of compositions which contain the same components as the azeotrope, which not only will exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture, which may appear under many guises, depending upon the conditions chosen, by any of several criteria:

The composition can be defined as an azeotrope of A and B since the very term "azeotrope" is at once both definitive and limitative, and requires that effective amounts of A and B form this unique composition of matter, which is a constant boiling admixture at a given pressure.

It is well known by those skilled in the art that at different pressures, the composition of a given azeotrope will vary — at least to some degree — and changes in pressure will also change — at least to some degree — the boiling temperature. Thus, an azeotrope of A and B represents a unique type of relationship but with a variable composition which depends on temperature and/or pressure. Therefore, compositional ranges, rather than fixed compositions are often used to define azeotropes.

The composition can be defined as a particular weight percent relationship or mole percent relationship of A and B while recognizing that such specific values point out only one particular such relationship and that in actuality, a series of such relationships, represented by A and B actually exist for a given azeotrope, varied by the influence of pressure.

Azeotrope A and B can be characterized by defining the composition as an azeotrope characterized by a boiling point at a given pressure, thus giving identifying characteristics without unduly limiting the scope of the invention by a specific numerical composition, which is limited by and is only as accurate as the analytical equipment available.

It is recognized in the art that the difference between dew point temperature and bubble point temperature is an indication of the constant boiling or azeotrope-like behavior of mixtures. It has been unexpectedly found that compositions some distance away from the azeotrope compositions of this invention have differences in dew point/bubble point temperatures of less than or equal to one degree Celsius. The small temperatures differentials demonstrated by these compositions are less than values for azeotrope-like ternary mixture of HCFC-22, HFC-152a, and HCFC-124 described in U.S. Pat. No. 4,810,403.

Therefore, included in this invention are the azeotrope-like compositions having dew point/bubble point differences of less than or equal to one degree Celsius reported in Table III. These data confirm the azeotrope-like behavior of the compositions claimed in this invention. The value for the ternary mixture of U.S. Pat. No. 4,810,403 is shown for comparison.

TABLE III

| Components | Composition* | Maximum Difference In Dew Point/ Bubble Point Temp., °C. |
|---|---|---|
| HCFC-22/HFC-152a/ HCFC-124 | 36/24/40 | 5.3 |
| HFC-134/HFC-152a | 1-20% HCFC-142b | 0.0 |
| HFC-134/HCFC-142b | 1-10% HFC-142b | 0.0 |

TABLE III-continued

| Components | Composition* | Maximum Difference In Dew Point/ Bubble Point Temp., °C. |
|---|---|---|
| HFC-134/HCFC-142b | 1-40% HFC-142b | 0.8 |
| HFC-134/DME | 1-40% DME | 0.7 |
| HFC-134/FC-C318 | 1-50% FC-C318 | 1.0 |
| HFC-134/n-butane | 1-20% n-butane | 0.7 |
| HFC-134/iso-butane | 1-30% iso-butane | 0.7 |
| HFC-134/HFC-227ea | 1-99% HFC-227ea | 0.8 |

*weight percent; 14.7 psia pressure.

The azeotropic and azeotrope-like compositions of the invention are useful as refrigerants, expansion agents and as aerosol propellants, among other applications. The azeotropic and azeotrope-like compositions of 1,1,1,2-tetrafluoroethane and one of perfluorocyclobutane and 1,1,1,2,3,3,3-heptafluoropropane are also useful as fire extinguishants.

Mixtures of HFC-134, HFC-227ea, and FC-C318 are nonflammable. The azeotropes of HFC-134 and HFC-152a or HCFC-142b are also nonflammable. Additionally, mixtures of HFC-134 and n-butane, isobutane and DME can be formulated such that they are nonflammable. Therefore, the azeotropic compositions of HFC-134, n-butane, isobutane or DME are of significantly reduced flammability compared with n-butane, isobutane or DME alone.

Another aspect of the invention is a refrigeration method which comprises condensing a refrigerant composition of the invention and thereafter evaporating it in the vicinity of a body to be cooled. Similarly, still another aspect of the invention is a method for heating which comprises condensing the invention refrigerant in the vicinity of a body to be heated and thereafter evaporating the refrigerant.

In the heating and cooling applications, the nonflammable compositions are particularly useful.

These azeotropic and azeotrope-like compositions are useful as propellants for aerosol sprays, e.g., room fresheners. The azeotropes are particularly attractive as they do not separate or fractionate when used in aerosol packages equipped with vapor tap valves wherein the propellant is removed, at least partially, in the vapor phase.

The HFC-134/DME azeotropic and azeotrope-like compositions are excellent polymer blowing agents. The dimethyl ether component unexpectedly solubilizes the poorly soluble HFC-134 in polyurethane, phenolic and polystyrene foam, resulting in excellent insulating foams. Once solubilized in the foam, the HFC-134 insulating gas does not diffuse out of the foam. The amount of blowing agent used is from about 5 to 10 weight percent of the polymer foam formulation. The compositions of this invention have vapor pressures and refrigeration energy efficiency values near that of CFC-12, hence are useful as refrigerants in refrigeration processes. They also show zero or low ozone depletion potential and compositions can be chosen such that they are nonflammable.

The binary refrigerant compositions of the invention are useful in compression cycle applications including air conditioner and heat pump systems for producing both cooling and heating. The new refrigerant mixtures can be used in refrigeration applications as described in U.S. Pat. No. 4,482,465 to Gray, which patent is incorporated herein by reference.

The HFC-134/dimethyl ether azeotrope of the invention has a vapor pressure at 70° F. (21° C.) of about 45 psig (412 KPa). This vapor pressure makes the azeotrope attractive and useful as an aerosol propellant.

The HFC-134/dimethyl ether azeotrope has been determined to be soluble in polystyrene. Thus the azeotrope and, more particularly, the nonflammable mixtures of HFC-134 and dimethyl ether are potentially excellent blowing agents for polystyrene.

Additionally, the HFC-134/dimethyl ether azeotrope is soluble in polyurethane polyols; whereas, FC-134 has quite poor solubility.

The language "consisting essentially of 1,1,2,2-tetrafluoroethane" is not intended to exclude the inclusion of minor amounts of other materials such as lubricants and stabilizers which do not significantly alter the azeotropic character of the azeotropic composition.

The compositions of the instant invention can be prepared by any convenient method including mixing or combining, by other suitable methods, the desired amounts of the components, using techniques well-known to the art.

Specific examples illustrating the invention are given below. Unless otherwise stated therein, all percentages are by weight. It is to be understood that these examples are merely illustrative and in no way to be interpreted as limiting the scope of the invention.

EXAMPLE 1

A phase study was made on 1,1,2,2-tetrafluoroethane (HFC-134) and HFC-152a, HCFC-142b, HFC-227ea, FC-C318, n-butane, isobutane and DME, respectively, wherein the compositions were varied and the vapor pressures measured. The following azeotropic compositions reported in Table IV were defined:

TABLE IV

| Components | Composition* | Temp. °C. | Vapor Pressure, psia (kPa) |
|---|---|---|---|
| HFC-134/HFC-152a | 92.0/8.0 | 10 | 46.5 (321) |
| HFC-134/HCFC-142b | 95.9/4.1 | −17 | 16.6 (114) |
| HFC-134/DME | 73.5/26.5 | 0 | 28.1 (194) |
| HFC-134/FC-C318 | 62.3/37.7 | 0 | 36.9 (254) |
| HFC-134/n-butane | 83.1/16.9 | 10 | 56.9 (392) |
| HFC-134/isobutane | 76.7/23.3 | 10 | 63.5 (438) |
| HFC-134/HFC-227ea | 52.0/48.0 | −10 | 23.5 (162) |

*All compositions are ± 2 wt. percent.

EXAMPLE 2

A determination was made of dew point and bubble point temperatures for the mixtures of the invention, shown in Table V. All have temperature differentials of less than or equal to one degree Celsius.

TABLE V

| | Temperature, °C. at 14.7 psia | | |
|---|---|---|---|
| Composition, wt. % | Dew Point | Bubble Point | Difference |
| HFC-134/HFC-152a | | | |
| 99    1 | −19.6 | −19.6 | 0.0 |
| 92    8 | −19.5 | −19.5 | 0.0 |
| 90    10 | −19.5 | −19.5 | 0.0 |
| 80    20 | −19.7 | −19.7 | 0.0 |
| HFC-134/HCFC-142b | | | |
| 99    1 | −19.6 | −19.6 | 0.0 |
| 95.9    4.1 | −19.7 | −19.7 | 0.0 |
| 90    10 | −19.6 | −19.6 | 0.0 |
| 70    30 | −18.4 | −18.9 | 0.5 |
| 60    40 | −17.4 | −18.2 | 0.8 |
| HFC-134/DME | | | |
| 99    1 | −19.2 | −19.4 | 0.2 |
| 95    5 | −17.9 | −18.5 | 0.6 |
| 90    10 | −17.0 | −17.5 | 0.5 |
| 73.5    26.5 | −16.2 | −16.2 | 0.0 |
| 70    30 | −16.2 | −16.3 | 0.1 |
| 60    40 | −16.6 | −17.3 | 0.7 |
| HFC-134/FC-C318 | | | |
| 99    1 | −20.3 | −19.9 | 0.4 |
| 95    5 | −21.6 | −20.6 | 1.0 |
| 90    10 | −22.1 | −21.2 | 0.9 |
| 70    30 | −22.0 | −22.2 | 0.2 |
| 62.3    37.7 | −22.2 | −22.2 | 0.0 |
| 60    40 | −22.2 | −22.2 | 0.0 |
| 50    50 | −21.1 | −22.1 | 1.0 |
| HFC-134/n-butane | | | |
| 95    5 | −24.6 | −24.0 | 0.6 |
| 90    10 | −24.4 | −24.5 | 0.1 |
| 83.1    16.9 | −24.6 | −24.6 | 0.0 |
| 80    20 | −23.9 | −24.9 | 0.7 |
| HFC-134/iso-butane | | | |
| 95    5 | −27.4 | −26.8 | 0.6 |
| 90    10 | −27.8 | −27.5 | 0.3 |
| 80    20 | −27.8 | −27.8 | 0.0 |
| 76.7    23.3 | −27.7 | −27.7 | 0.0 |
| 70    30 | −27.1 | −27.8 | 0.7 |
| HFC-134/HFC-227ea | | | |
| 99    1 | −19.7 | −19.7 | 0.0 |
| 95    5 | −19.8 | −19.9 | 0.1 |
| 90    10 | −20.0 | −20.2 | 0.2 |
| 70    30 | −20.8 | −20.9 | 0.1 |
| 52    48 | −21.1 | −21.1 | 0.0 |
| 30    70 | −20.3 | −20.6 | 0.3 |
| 10    90 | −18.0 | −18.8 | 0.8 |
| 5    95 | −17.2 | −17.8 | 0.6 |
| 1    99 | −16.5 | −16.7 | 0.2 |

EXAMPLE 3

An evaluation of the refrigeration properties of the mixtures of the invention versus dichlorodifuoromethane (CFC-12) and 1,1,2,2-tetrafluoroethane (HFC-134), respectively, are shown in the following Table VI. The data were generated on a one ton basis, that is to say, on the removal of heat from a space at the rate of 12,000 Btu/hr (3526 watts). The data are based on the ideal refrigeration cycle.

TABLE VI

COMPARISON OF REFRIGERATION PERFORMANCES

| | Weight Percentages | | | | |
|---|---|---|---|---|---|
| | CFC-12 | HFC-134 | 62% HFC-134 38% C318 | 75% HFC-134 25% DME | 90% HFC-134 10% DME |
| Evaporator | | | | | |
| Temp., °F. | 0 | 0 | 0 | 0 | 0 |
| (°C.) | (−17.7) | (−17.7) | (−17.7) | (−17.7) | (−17.7) |
| Press. psia | 23.8 | 15.9 | 18.2 | 12.4 | 13.1 |
| (kPa) | (164.) | (110.) | (125.) | (85.) | (90.) |
| Condenser | | | | | |

TABLE VI-continued

| Temp., °F. | 130 | 130 | 130 | 130 | 130 |
|---|---|---|---|---|---|
| (°C.) | (54.4) | (54.4) | (54.4) | (54.4) | (54.4) |
| Press. psia | 195.7 | 170.5 | 181.8 | 141. | 152.8 |
| (kPa) | (1349.) | (1175.) | (1253.) | (974.) | (1053.) |
| Superheat, °F. | 90 | 90 | 90 | 90 | 90 |
| Subcool, °F. | 40 | 40 | 40 | 40 | 40 |
| Coefficient of Performance | 2.42 | 2.50 | 2.36 | 2.58 | 2.50 |
| Displacement ft³/min/ton | 8.1 | 10.4 | 10.3 | 12.4 | 12.0 |

| | Weight Percentages | | | | | |
|---|---|---|---|---|---|---|
| | 90% HFC-134 10% HFC-152a | 75% HFC-134 25% HCFC-142b | 90% HFC-134 10% HCFC-142b | 52% HFC-134 48% HFC-227ea | 83% HFC-134 17% n-butane | 77% HFC-134 23% isobutane |
| Evaporator | | | | | | |
| Temp., °F. | 0 | 0 | 0 | 0 | 0 | 0 |
| (°C.) | (−17.7) | (−17.7) | (17.7) | (17.7) | (17.7) | (17.7) |
| Press. psia | 16.0 | 15.4 | 15.8 | 17.5 | 12.8 | 14.4 |
| Condenser | | | | | | |
| Temp., °F. | 130 | 130 | 130 | 130 | 130 | 130 |
| (°C.) | (54.4) | (54.4) | (54.4) | (54.4) | (54.4) | (54.4) |
| Press. psia | 169.7 | 161.4 | 167.3 | 178.6 | 141.1 | 148.5 |
| (kPa) | (1170) | (1113.) | (1153.) | (1232) | (974) | (1025) |
| (kPa) | | | | | | |
| Superheat, °F. | 90 | 90 | 90 | 90 | 90 | 90 |
| Subcool, °F. | 40 | 40 | 40 | 40 | 40 | 40 |
| Coefficient Performance | 2.51 | 2.49 | 2.50 | 2.34 | 2.50 | 2.47 |
| Performance Displacement ft³/min/ton | 10.3 | 10.9 | 10.5 | 10.7 | 12.9 | 12.0 |

Coefficient of Performance (COP) is a measure of refrigerant energy efficiency.

Additives such as lubricants, corrosion inhibitors, stabilizers, dyes and other appropriate materials may be added to the novel compositions of the invention for a variety of purposes provided they do not have an adverse influence on the composition, for their intended applications.

EXAMPLE 4

Aerosol room fresheners were prepared with the azeotropes of HFC-134 with HFC-152a, HCFC-142b, DME, FC-C318, n-butane and isobutane. The formulations and vapor pressures are reported in Table VII.

TABLE VII

AEROSOL ROOM FRESHENER FORMULATION

| | Wt. % | | | | | |
|---|---|---|---|---|---|---|
| Ingredient | 1 | 2 | 3 | 4 | 5 | 6 |
| Perfume | 2.0 | 2.0 | 2.0 | 2.0 | 2.0 | 2.0 |
| Propellant* | 98.0A | 98.0B | 98.0C | 98.0D | 98.0E | 98.0F |
| Vapor Pressure at 70° F., psig (21° C., kPa) | 55 (481) | 54 (474) | 46 (419) | 74.5 (615) | 69 (578) | 76 (626) |

*Propellants
A - HFC-134-152a (97.4/2.6)
B - HFC-134/HCFC-142b (96.8/3.2)
C - HFC-134/DME (74.4/25.3)
D - HFC-134/FC-C318 (62.1/37.9)
E - HFC-134/n-butane (82.5/17.5)
F - HFC-134/isobutane (74.0/26.0)

EXAMPLE 5

The solubilities of the HFC-134 azeotropes were determined in a polyurethane polyol. The azeotropes of HFC-134 with HFC-152a, HCFC-142b, DME, n-butane and isobutane were readily soluble at 30.0 wt. % in the polyol, as was HFC-134 itself. The solubility data are summarized in Table VIII.

TABLE VIII

SOLUBILITY OF HFC-134/DIMETHYL ETHER AZEOTROPE IN POLYOL

| Blowing Agent | Wt. % in Polyol* | Appearance |
|---|---|---|
| HFC-134 | 30.0 | Soluble, single phase |
| HFC-134/HFC-152a (97.4/2.6) | 30.0 | Soluble, single phase |
| HFC-134/HCFC-142b (96.8/3.2) | 30.0 | Soluble, single phase |
| HFC-134/DME (74.7/25.3) | 30.0 | Soluble, single phase |
| HFC-134/n-butane (82.5/17.5) | 30.0 | Soluble, single phase |
| HFC-134/isobutane (74.0/26.0) | 30.0 | Soluble, single phase |

*Stepanpol PS-2852 (Stepan Company), an aromatic polyester polyol.

EXAMPLE 6

The solubility of the HFC-134 azeotropes in polystyrene was determined by combining a piece of polystyrene (about 2.5 cm long, 0.5 cm wide and 0.5 cm thick) with about 50 g. azeotrope. Only the HFC-134/DME (74.7/25.3) and the HFC-134/n-butane (82.5/17.5) azeotropes had any appreciable solubility in polystyrene, softening and deforming the piece of polystyrene. The data are summarized in Table IX.

TABLE IX

SOLUBILITY OF HFC-134 AZEOTROPES IN POLYSTYRENE

| Blowing Agent | Appearance of Polystyrene |
|---|---|
| HFC-134 | Essentially no effect |
| HFC-134/HFC-152a (97.4/2.6) | Essentially no effect |
| HFC-134/HCFC-142b (96.8/3.2) | Essentially no effect |
| HFC-134/FC-C318 | Essentially no effect |

TABLE IX-continued

SOLUBILITY OF HFC-134 AZEOTROPES IN POLYSTYRENE

| Blowing Agent | Appearance of Polystyrene |
|---|---|
| (62.1/37.9) HFC-134/DME | Polystyrene softened and deformed* |
| (74.7/25.3) HFC-134/n-butane | Polystyrene softened and deformed* |
| (82.5/17.5) HFC-134/isobutane | Essentially no effect |
| (74.0/26.0) | |

*On removing the polystyrene from the azeotrope, expansion occurred from solubilized HFC-134.

We claim:

1. An azeotrope-like composition consisting essentially of about 60–99 weight percent 1,1,2,2,-tetrafluoroethane and about 1 to 40 weight percent dimethyl ether said composition having a boiling temperature of about 0 degrees C. when the pressure is adjusted to about 28 psig and consists essentially of about 74 weight percent 1,1,2,2-tetraflu 2. The composition of claim 1 which is azeotropic and consists essentially of about 74 weight percent 1,1,2,2-tetrafluoroethane and about 26 weight percent dimethyl ether, said composition having a boiling temperature of about 0 degrees C. when the pressure is adjusted to about 28 psia.

3. A process of producing refrigeration which comprises condensing a composition of any one of claims 1 through 2 and thereafter evaporating said mixture in the vicinity of a body to be cooled.

4. A process for preparing a polymer foam from a polymer foam formulating comprising solubilizing an effective amount of a composition of any one of claims 1-2 as a blowing agent in the polymer foam formulation followed by blowing the polymer foam formulation into a polymer foam.

5. The process of claim 4 wherein the amount of blowing agent is from about 5 to 30 weight percent of the polymer foam formulation.

6. The process of claim 4 wherein the polymer foam is a polyurethane foam.

7. The process of claim 4 wherein the polymer foam is a phenolic foam.

8. The process of claim 4 wherein the polymer foam is a polystyrene foam.

9. A process for preparing aerosol formulations wherein active ingredients are combined in an aerosol container with an effective amount of the composition of any one of claims 1 through 2 as propellant.

* * * * *

UNITED STATES PATENT AND TRADEMARK OFFICE
CERTIFICATE OF CORRECTION

PATENT NO. : 5,182,040
DATED : January 26, 1993
INVENTOR(S) : Bartlett et al.

It is certified that error appears in the above-identified patent and that said Letters Patent is hereby corrected as shown below:

In the ABSTRACT - line 2:

"1,1,1.2-tetrafluoroethane" should read

-- 1,1,2,2-tetrafluoroethane --.

Signed and Sealed this

Twenty-second Day of February, 1994

Attest:

BRUCE LEHMAN

Attesting Officer          Commissioner of Patents and Trademarks

UNITED STATES PATENT AND TRADEMARK OFFICE
CERTIFICATE OF CORRECTION

PATENT NO. : 5,182,040

DATED : January 26, 1993

INVENTOR(S) : Philip L. Bartlett et al.

It is certified that error appears in the above-identified patent and that said Letters Patent is hereby corrected as shown below:

Col. 11,
Claim 1. An azeotrope-like composition consisting essentially of about 60-99 weight percent 1,1,2,2-tetrafluoroethane and about 1 to 40 weight percent dimethyl ether, said composition having a boiling temperature of about 0 degrees C when the pressure is adjusted to about 28 psia.

Signed and Sealed this

Second Day of July, 1996

Attest:

BRUCE LEHMAN

Attesting Officer

Commissioner of Patents and Trademarks